Figure 1:
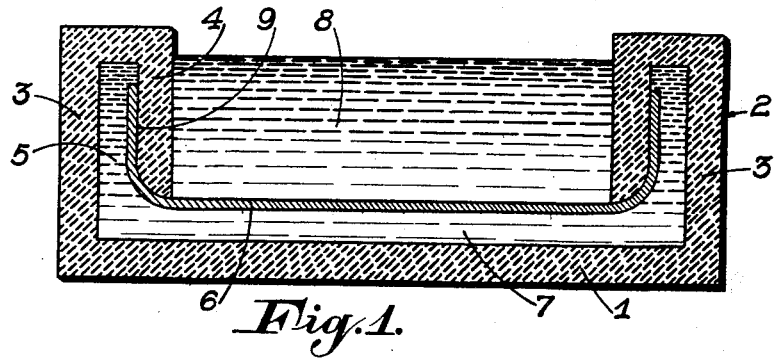

Dec. 29, 1964   E. BRICHARD   3,163,408
FURNACE FOR WORKING PRODUCTS SUCH AS GLASS
Filed Dec. 12, 1961

INVENTOR
EDGARD BRICHARD
BY
Corey, Hart + Stemple
ATTORNEYS

United States Patent Office 3,163,408
Patented Dec. 29, 1964

3,163,408
FURNACE FOR WORKING PRODUCTS
SUCH AS GLASS
Edgard Brichard, Jumet, Belgium, assignor to S. A.
Glaverbel, Brussels, Belgium, a company of Belgium
Filed Dec. 12, 1961, Ser. No. 158,791
Claims priority, application Belgium, Dec. 14, 1960,
475,714, Patent 598,160
12 Claims. (Cl. 263—47)

The invention relates to a furnace for working products such as glass, and to a process for working the said furnace, and concerns more especially the tank of the said furnace.

For the sake of clarity of the description, the generic term "glass" will be exclusively employed to denote both glass proper and analogous products such as enamels, fused silicates or other products exhibiting the effect of pasty fusion at high temperature.

The high temperatures usual in the course of the working of glass necessitate the use of refractories which conform to fairly strict specifications. These refractories must work correctly at temperatures of the order of 1200° to 1600° C. Moreover, on coming into contact with glass, they cannot contaminate the glass itself in any way. Inter alia, it is necessary to avoid the use of refractory materials which give rise to the formation of bubbles in the glass, as also those which are capable of dissolving to an appreciable extent in glass.

A disadvantage of refractory materials is that they become gradually worn by erosion and dissolution in contact with a stream of glass. This effect is manifested notably by the detachment of fragments of refractory material which are thereafter dispersed in the glass and are likely to give rise to the formation of flaws in the finished products. In addition, the glass being worked very rapidly corrodes the refractories at the level of the surface of the bath, and therefore at the refractory-glass-atmosphere interface. Consequently, the bricks must frequently be replaced at this level.

Consequently, it is necessary to use refractory materials of very high quality which do not obviate the aforesaid disadvantages, but only lessen them to some extent. On the other hand, the gradual wear on the refractories in the course of the running of a furnace entails very heavy costs of repair.

It has been proposed to coat the tank of the furnace with sheet metal or a layer of metal which adheres to the tank. This arrangement has a considerable disadvantage in that the metal of which the sheet or thin layer is formed is brought to very high temperature and simultaneously subjected to the corrosive action of the air or the atmosphere of the furnace. It is therefore necessary to use very costly noble metals. The present invention obviates these disadvantages and in addition affords advantages which will be more clearly apparent from the following description.

In accordance with the invention, the furnace comprises a metal sheet isolating at least a part of the tank from the materials being worked and defining between the tank and the metal sheet a cavity which is sealed from the contents of the tank. By separation of the materials being worked from the tank of the furnace, a large number of disadvantages are obviated. In the first place, the wear on the refractory materials is reduced, since they are no longer in contact with the stream of materials being worked. In addition, these materials are not contaminated either by refractory debris or by certain constituents which dissolve. Finally, the positioning of the metal sheet prevents the refractory materials from introducing gas bubbles into the materials being worked.

Moreover, since the metal sheet is completely immersed in liquids, it is not in contact with hot gases and hence cannot be corroded. Although the metal sheet may be rendered resistant to corrosion by liquids by making it of a metal or an alloy which is either noble or only slightly subject to corrosion, such as platinum, molybdenum or tungsten, it is advantageous to make it of a commoner metal or alloy, such as steel, which is coated with a thin corrosion-resistant layer. Such a layer consists, for example, of sparingly corrodible metals or alloys such as those hereinbefore described or of mixtures of refractory compounds such as carbides, nitrides, oxides or silicates.

In some embodiments, the metal sheet is covered with a thin protective layer only over part of its surface, for example that part which is in contact with the materials to be worked. In other forms, the parts in contact with different fluids are protected by different thin layers. For example, the surfaces in contact with the materials being worked will be protected by refractory metals or certain compounds, while the zones which may come into contact with fused metals are coated with other compounds, such as oxides or silicates.

The layer of fused material disposed between the tank and the metal sheet consists either of a fused metal or a mixture of fused metals, or of a mixture of fused oxides preferably constituting a material similar to that being worked in the furnace, for example a glass in glass furnaces. Since this layer is not in contact with the materials being worked, it is of little importance whether it is contaminated by the refractories or by the metal sheet. This layer is not subjected to any movement as a whole, so that it exerts only a very limited destructive action on the refractory materials of which the tank of the furnace is constructed.

Furthermore, in accordance with the present invention, the side walls of the tank comprise a circumferential cavity open at the bottom towards the interior of the tank, which cavity is intended to receive the raised edges of the metal sheet and to contain the molten material disposed between the metal sheet and the tank of the furnace. By this arrangement, a fluid-tight seal is provided between the molten materials situated on either side of the metal sheet.

Although the materials being worked may be left in contact with the metal sheet, it is advantageous to dispose between these materials and the metal sheet separating the tank of the furnace from the materials being worked a layer of fused material which is immiscible with the materials being worked. In accordance with one variant of this method, a number of layers immiscible with one another are interposed, of which the upper layer, i.e. the least dense layer, is not miscible with the materials being worked. There is advantageously employed in contact with the material being worked a layer of fused metal or metals such as lead, tin or copper. As the dense layer disposed between the metal sheet and the layer of fused metal there is preferably employed a mixture of oxides, such as a glass containing a considerable proportion of lead oxide.

A number of constructional forms of a furnace according to the invention are illustrated by way of example in the accompanying drawings.

Figure 2:
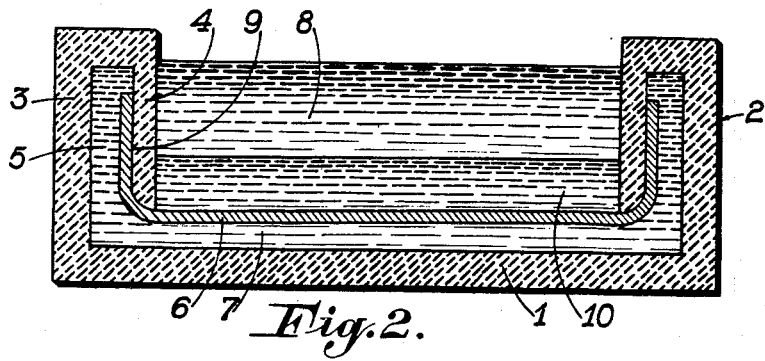
Figure 3:
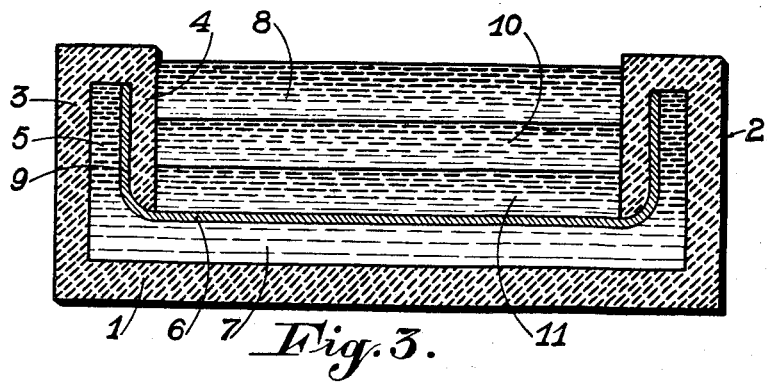

FIGURES 1 to 3 are vertical sections through a furnace according to the invention. In these figures, only the tank of the furnace has been shown, to the exclusion of all other parts and accessories, such as the crown or the burners.

In all the figures, the tank of the furnace comprises the base 1 and the side walls 2. The side walls 2 are composed of two walls 3 and 4, one of which is situated outside the furnace and the other within the furnace and between which is situated a cavity 5. A metal sheet 6 covers the base 1 of the furnace at some distance therefrom. The sheet 6 is bent over into the cavity 5 and applied against the inner walls 4 of the side walls 2. Extending between the base 1 and the sheet 6 is a cavity 7 which communicates with the cavities 5 between the side walls 2. The cavities 5 and 7 are filled with fused material.

According to FIGURE 1, the useful volume of the tank which contains the materials 8 being worked, such as molten glass, extends between the inner walls 4 of the side walls 2 and the metal sheet 6.

The fused materials situated in the cavities 5 and 7 are either fused metals or preferably fused glass, for example identical to that being worked up in 8. Likewise, a dense glass is advantageously employed which contains, for example, from 50% to 80% of $SiO_2$, from 20% to 30% of PbO and from 0% to 20% of $B_2O_3$, or again a batch containing from 40% to 80% of $SiO_2$, from 1% to 20% of $Al_2O_3$, from 8% to 25% of CaO, from 1% to 7% of MgO, from 2% to 10% of $Na_2O$ and from 1% to 15% of BaO.

Although the metal sheet 6 may consist of a metal which is only slightly subject to corrosion by molten glass, for example platinum, molybdenum or tungsten, it is advantageous to employ a carbon steel or a refractory steel, which may be coated with a protective layer. This layer may consist of a metal such as those indicated in the foregoing or of one or more oxides such as an oxide of chromium, aluminum, zirconium or silicon, or of carbides such as a carbide of silicon, molybdenum, tungsten or calcium, or of nitrides or silicates or of a mixture of these compounds.

In the furnace, the metal sheet 6 may be relatively thin, since it has not to take up any mechanical force, by reason of the fact that it is supported by the molten materials contained in 7. On the other hand, since it forms a diaphragm, it prevents any pressure difference from being set up between the materials contained in 7 and 5 and the glass 8 being worked, so that no exchange can take place between these materials along the surface 9 situated between the wall 4 and the sheet metal 6.

In this arrangement also, the base and the walls 2 may be made of materials of reduced quality than that required in the furnaces normally employed. They are only slightly subject to corrosion because they are in contact with a substantially immobile liquid which is not renewed. On the other hand, the inner faces 4 are preferably made of materials of high quality.

In the constructional form illustrated in FIGURE 2, a layer of used metal 10 is disposed between the metal sheet 6 and the glass 8.

FIGURE 3 illustrates a constructional form similar to that of FIGURE 2, but in which a layer of dense glass 11 is disposed between the fused metal 10 and the metal sheet 11. The fused metal is chosen from metals such as lead, zinc, tin or copper, or mixtures of these metals. A dense glass composition appropriate for the formation of the layer 11 contains, for example, from 90% to 95% of PbO and from 5% to 10% $SiO_2$. Such a glass is of higher density than many fused metals floating on its surface. In this arrangement, the layers covering the metal sheet 6 will preferably be differently chosen in accordance with whether the metal sheet is in contact with fused metals or a fused glass and chosen in accordance with their resistance to corrosion by each of the particular liquids.

Of course, the invention is not limited to the embodiments which have been described and illustrated by way of example, and modifications may be made thereto without departing from its scope.

I claim:

1. A furnace tank adapted to retain molten glass being passed therethrough comprising an outer jacket of non-metallic refractory material and an inner jacket, each jacket having side and bottom walls in spaced relation to each other to provide a continuous cavity between said jackets adapted to be filled with non-circulating fused materials, said inner jacket having side walls of non-metallic refractory material and an overlapping bottom wall of thin metal that provides a fluid-tight seal to said cavity, said inner jacket bottom wall forming a diaphragm adapted to cover and be supported by said fused material.

2. The tank of claim 1 wherein the non-metallic refractory material of said outer jacket is of lower quality than the non-metallic refractory material of said inner jacket.

3. The tank of claim 1 wherein said bottom wall metal is selected from the group consisting of platinum, molybdenum, tungsten and coated steel.

4. The tank of claim 3 wherein said metal is steel and is coated with a material selected from the group consisting of platinum, molybdenum and tungsten.

5. The tank of claim 1 wherein said inner jacket is adapted to contain molten glass and said cavity is filled with said non-circulating fused material.

6. The tank of claim 5 wherein said fused material is glass.

7. The tank of claim 5 wherein said bottom metal wall is covered with a layer of a second fused material immiscible with said molten glass.

8. The tank of claim 7 wherein said second fused material is a metal.

9. The tank of claim 7 wherein said second fused material is a second molten glass that is denser than said other molten glass.

10. The tank of claim 7 wherein said second fused material is a metal selected from the group consisting of lead, zinc, tin and copper.

11. The tank of claim 5 wherein said bottom metal wall is covered with a layer of a second molten glass that is denser than said other molten glass and said layer of second molten glass is covered with a layer of fused metal.

12. The tank of claim 11 wherein said fused metal is selected from the group consisting of lead, tin, zinc and copper.

References Cited by the Examiner

UNITED STATES PATENTS

| | | | |
|---|---|---|---|
| 214,572 | 4/79 | Leuffgen | 263—48 |
| 789,911 | 5/05 | Hitchcock | 65—182 |
| 1,275,196 | 8/18 | Aramaki | 263—48 |
| 1,553,773 | 9/25 | Heal | 65—182 X |
| 2,195,436 | 4/40 | Weller | 263—48 |
| 2,323,265 | 6/43 | Willetts | 263—47 X |

CHARLES SUKALO, *Primary Examiner.*

JOHN J. CAMBY, PERCY L. PATRICK, *Examiners.*